(12) United States Patent
Wang et al.

(10) Patent No.: US 8,061,663 B2
(45) Date of Patent: Nov. 22, 2011

(54) SUPPORT MECHANISM

(75) Inventors: Jin-Xin Wang, Shenzhen (CN); Liang Wei, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 229 days.

(21) Appl. No.: 12/579,578

(22) Filed: Oct. 15, 2009

(65) Prior Publication Data
US 2010/0258688 A1    Oct. 14, 2010

(30) Foreign Application Priority Data

Apr. 13, 2009  (CN) .......................... 2009 1 0301531

(51) Int. Cl.
*F16M 1/00* (2006.01)

(52) U.S. Cl. ............. 248/162.1; 248/123.11; 248/176.1; 248/917; 248/919; 248/923

(58) Field of Classification Search ............... 248/176.1, 248/162.1, 917–923, 123.11, 372.1, 396, 248/393
See application file for complete search history.

(56) References Cited

U.S. PATENT DOCUMENTS

| 7,036,787 | B1 * | 5/2006 | Lin | 248/676 |
| 7,404,233 | B2 * | 7/2008 | Lu et al. | 16/302 |
| 7,789,363 | B2 * | 9/2010 | Duan | 248/284.1 |
| 2007/0095993 | A1 * | 5/2007 | Yamamoto | 248/284.1 |

* cited by examiner

*Primary Examiner* — Amy J Sterling
(74) *Attorney, Agent, or Firm* — Altis Law Group, Inc.

(57) ABSTRACT

A support mechanism includes a base and a lifting mechanism mounted on the base. The base defines a limiting slot. The lifting mechanism includes a first arm, a second arm, a connecting mechanism including a rod, and an elastic member. The first arm has a first end and a second end and includes a limiting member slidably received in the limiting slot. The second arm has a second end and a first end adjacent to the first end of the first arm and away from the second end of the first arm. The connecting mechanism includes a rod. The elastic member is connected to the first end of the first arm and the first end of the second arm. The first end of the first arm and the rod are pivotally connected to the base, and the first end of the second arm pivotally connects to the rod.

17 Claims, 3 Drawing Sheets

SUPPORT MECHANISM

BACKGROUND

1. Technical Field

The present disclosure generally relates to support mechanisms, particularly, to a support mechanism for a display device.

2. Description of Related Art

A frequently used display can generally be repositioned along two axes. The display panel rotates along a horizontal axis to allow viewing from an appropriate angle. The display panel also rotates about a vertical axis.

However, when the display device is to be viewed from multiple angles of varying height, it may be inconvenient.

Therefore, a support mechanism with adjustable height is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
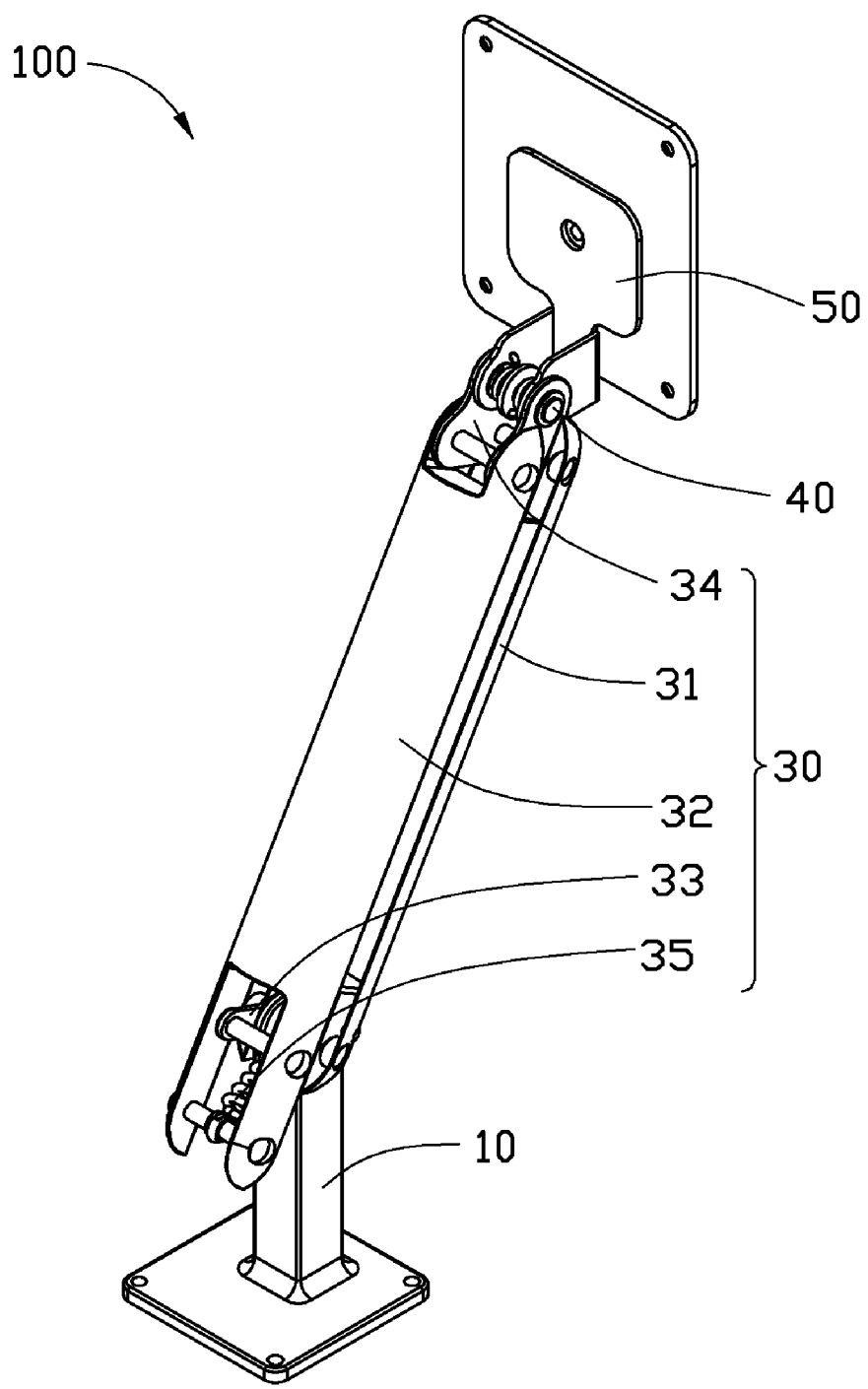
FIG. 1 is an assembled, isometric view of an embodiment of a support mechanism.

Referring to FIG. 1, an embodiment of a support mechanism 100 may be utilized with a display device. Alternatively, the support mechanism 100 may be utilized with other devices such as lamps and webcams. The support mechanism 100 includes a base 10, a lifting mechanism 30, a hinge mechanism 40, and a holding panel 50. The base 10 supports the lifting mechanism 30, the hinge mechanism 40, and the holding panel 50. The lifting mechanism 30 is fixed on the base 10, the hinge mechanism 40 rotatably connects the holding panel 50 to the lifting mechanism 30, and the holding panel 50 is fixed to a display panel (not shown).

Figure 2:
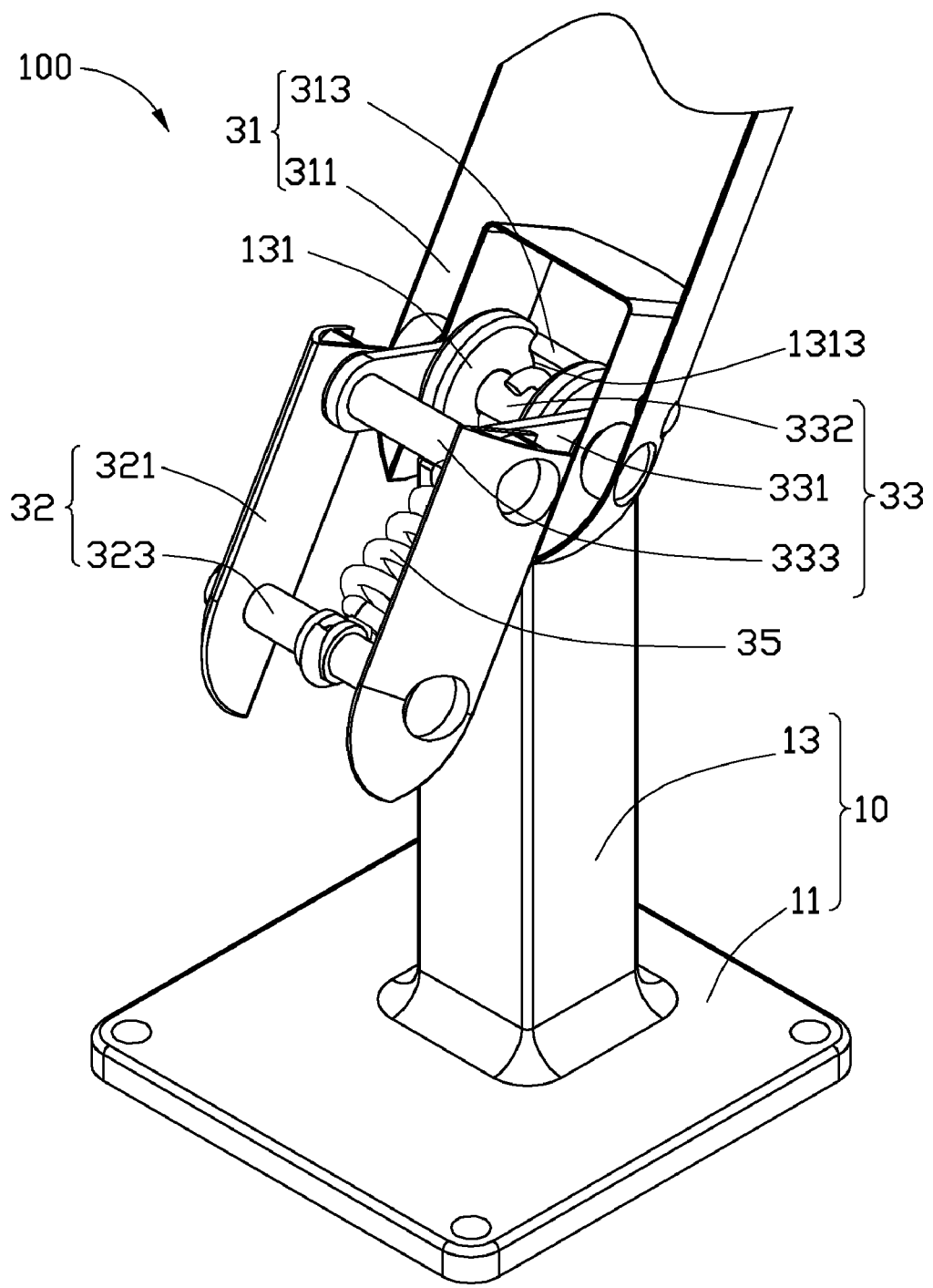
FIG. 2 is a partial view of the support mechanism of FIG. 1.
Figure 3:
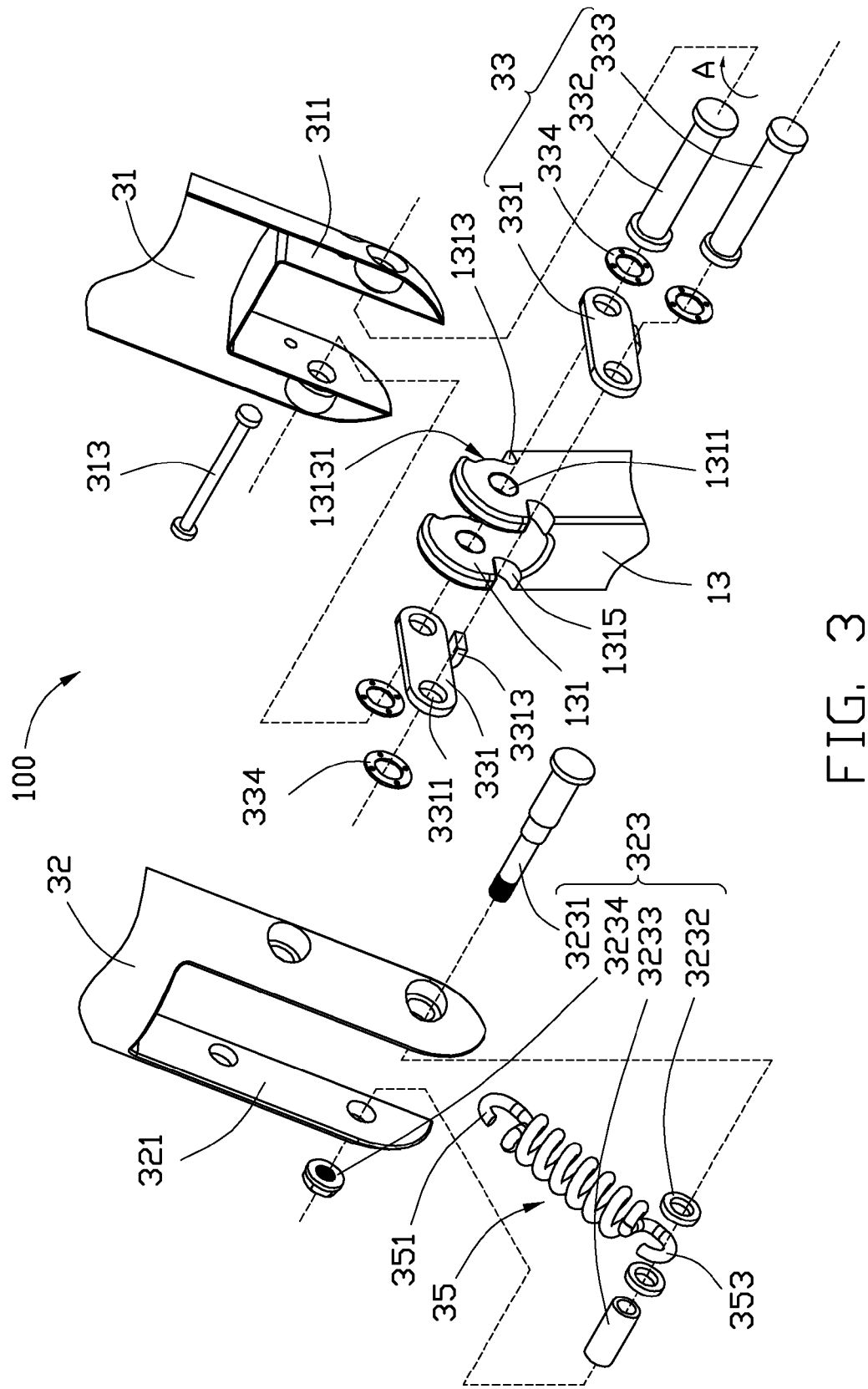
FIG. 3 is an exploded, isometric view of the support mechanism of FIG. 1.

Referring also to FIG. 2 and FIG. 3, the base 10 includes a plate 11 and a post 13 substantially perpendicular to the plate 11. The post 13 includes two connecting arms 131, each connecting arm 131 defines a shaft hole 1311, a limiting slot 1313, and a latching slot 1315. The limiting slot 1313 and the latching slot 1315 are defined at a periphery of the connecting arm 131, and a guiding surface 13131 is formed in the limiting slot 1313. A distance L (not labeled) between a center of the shaft hole 1311 and different points of the guiding surface 13131 increases as the distance between the guiding surface 13131 and the plate 11 decreases. That is, a distance between the top first end of the limiting slot 1313 and the center of the shaft hole 1311 is smaller than a distance between a bottom second end of the limiting slot 1313 and the center of the shaft hole 1311. Alternatively, a size and a slope angle of the limiting slot 1313 may be changed as required.

The lifting mechanism 30 includes a first arm 31, a second arm 32, a connecting mechanism 33 pivotally connecting the first arm 31 and the second arm 32 at a position adjacent to the base 10, two connecting pieces 34 pivotally connecting the first arm 31 and the second arm 32 at a position away from the base 10, and an elastic member 35 positioned between the first arm 31 and the second arm 32.

The first arm 31 includes two first pivot arms 311 pivotally connected with the connecting arms 131 of the base 10 and a limiting member 313 extending through the first pivot arms 311. The limiting member 313 can be a pin slidably received in the limiting slot 1313 and engaged with the guiding surface 13131. A friction is generated between the limiting member 313 and the guiding surface 13131. In assembly, when the limiting member 313 extends through the first pivot arms 311, ends of the limiting member 313 are riveted. The limiting member 313 may also be a bolt or integrally formed between the first pivot arms 311.

The second arm 32 includes two second pivot arms 321 pivotally connected with the connecting mechanism 33 and a connecting unit 323. The connecting unit 323 includes a shaft 3231, two rings 3232, a tube 3233, and a fastener 3234. The shaft 3231 extends through one second pivot arm 321, the tube 3233, and the other second pivot arm 321. The rings 3232 are sleeved on the tube 3233.

The connecting mechanism 33 includes two rods 331, a first pivot shaft 332, a second pivot shaft 333, and a plurality of washers 334. Each rod 331 defines two pivot holes 3311 at opposite ends and a tab 3313 at an edge. The tabs 3313 of the rods 331 are latched in the latching slots 1315 of the base 10. The first pivot shaft 332 extends through one of the first pivot arms 311, one washer 334, one pivot hole 3311 of one rod 331, the shaft hole 1311 of one of the connecting arms 131, the shaft hole 1311 of the other connecting arm 131, one pivot hole 3311 of the other rod 331, one washer 334, and the other first pivot arm 311, in that order. The second pivot shaft 333 extends through one second pivot arm 321, one washer 334, the other pivot hole 3311 of one rod 331, the other pivot hole 3311 of the other rod 331, one washer 334, and the other second pivot arm 321, in that order. Ends of the first pivot shaft 332 and ends of the second pivot shaft 333 are riveted.

Shown in FIG. 1, the connecting pieces 34 are sheets pivotally connected to the first arm 31 and the second arm 32 respectively via two shafts (not labeled). The elastic member 35 is an extension spring including a first hook 351 and a second hook 353. The first hook 351 and the second hook 353 are hooked on the first pivot shaft 332 and the tube 3233 sleeved on the shaft 3231 respectively. The second hook 353 is positioned between the rings 3232. The hinge mechanism 40 connects the holding panel 50 with the connecting pieces 34, so that the holding panel 50 is rotatable relative to the lifting mechanism 30.

When no display panel is mounted on the holding panel 50, the elastic member 35 deforms slightly if at all, and the limiting member 313 is at a first end of the limiting slot 1313 away from the plate 11. In this state, a gap between the first arm 31 and the second arm 32 is maximal, and the first arm 31 and the second arm 32 are staggered from a distance along an extending direction of the first arm 31.

When a display panel is mounted on the holding panel 50, the weight of the display panel forces the first arm 31 to rotate around the first pivot shaft 332 along an direction A (see FIG. 3), and the limiting member 313 slides in the limiting slot 1313 along the guiding surface 13131. The rods 331 can only rotate along a direction opposite to the direction A for the tabs 3313 latched in the latching slots 1315. The second arm 32 rotates along a direction substantially parallel to the direction A. While rotating, the distance of the gap between the first arm 31 and the second arm 32 decreases, the distance that the first arm 31 and the second arm 32 are staggered from each other along the extending direction of the first arm 31 increases, and the elastic member 35 is further extended. The first arm 31 and the second arm 32 stops rotating once the support mechanism 100 reaches a balanced state. At this moment, the display panel is at a topmost position.

To lower the display panel, an external force applied on the display panel rotates the first arm 31 and the second arm 32, and the limiting member 313 slides in the limiting slot 1313 along the guiding surface 13131 towards the plate 11. As the display panel is lowered, friction force between the guiding surface 13131 and the limiting member 313 increases with the distance L, and with decreasing distance between the guiding surface 13131 and the plate 11, the elastic member 35 extends further. The increased friction force balances the increased elastic force of the elastic member 35, such that the lifting mechanism 30 and the display panel can be maintained at any position.

In the support mechanism 100, the elastic member 35 connects adjacent ends of the first arm 31 and the second arm 32, thus the elastic member 35 is short and occupies little space. In addition, since friction is generated between the limiting member 313 and the guiding surface 13131 of the base 10, the connecting mechanism 33 and the connecting unit 323 comprises few or even no friction washers. Thus, the connecting mechanism 33 and the connecting unit 323 are structurally simplified.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support mechanism, comprising:
a base defining a limiting slot; and
a lifting mechanism mounted on the base, the lifting mechanism comprising:
   a first arm having a first end and a second end, and comprising a limiting member slidably received in the limiting slot;
   a second arm having a second end and a first end adjacent to the first end of the first arm and away from the second end of the first arm;
   a connecting mechanism comprising a rod having a first end and a second end; and
   an elastic member connected to the first end of the first arm and the first end of the second arm, the elastic member having a first end and a second end;
wherein the first end of the first arm and the rod are pivotally connected to the base, and the first end of the second arm pivotally connects to the rod.

2. The support mechanism of claim 1, wherein the base defines a shaft hole, the first arm and the rod are pivotally mounted to the base around an axis of the shaft hole; the base comprises a guiding surface in the limiting slot, the guiding surface has a top end and a bottom end; a distance between a center of the shaft hole and different points of the guiding surface increases from the top end to the bottom end.

3. The support mechanism of claim 2 further comprising a hinge mechanism and a holding panel; the lifting mechanism further comprises a connecting piece pivotally connected to the first arm and the second arm; the hinge mechanism pivotally connects the holding panel with the connecting piece.

4. The support mechanism of claim 2, wherein the rod forms a tab engaged in a latching slot defined by the base.

5. The support mechanism of claim 4, wherein the second arm comprises a connecting unit comprising a shaft, two rings, a tube, and a fastener; the shaft extends through the second arm and the tube; the rings are sleeved on the tube; the first end of the elastic member engages with the shaft.

6. The support mechanism of claim 5, wherein the connecting mechanism further comprises a first pivot shaft and a second pivot shaft; the first pivot shaft pivotally extends through the first arm, the base, and the first end of the rod; the second pivot shaft pivotally extends through the second arm and the second end of the rod; the second end of the elastic member engages with the first pivot shaft.

7. The support mechanism of claim 6, wherein the connecting mechanism further comprises a plurality of washers sleeved on the first pivot shaft and the second pivot shaft.

8. The support mechanism of claim 6, wherein the base comprises a plate and a post substantially perpendicular thereto, the post comprising two connecting arms, each connecting arm defining the shaft hole allowing the first pivot shaft to pass therethrough, the limiting slot, and the latching slot; the limiting slot and the latching slot are defined at a periphery of the connecting arm.

9. The support mechanism of claim 8, wherein the first arm comprises two first pivot arms at the first end and pivotally sleeved on the first pivot shaft; the second arm comprises two second pivot arms at the first end and pivotally sleeved on the second pivot shaft.

10. A support mechanism, comprising:
a base defining a limiting slot and comprising a guiding surface therein; and
a lifting mechanism mounted on the base, the lifting mechanism comprising:
   a rod;
   a connecting piece;
   a first arm having a first end and a second end, and comprising a limiting member slidably received in the limiting slot and resisting the guiding surface;
   a second arm having a first end and a second end; and
   an elastic member positioned between the first arm and the second arm, the elastic member having a first end and a second end, wherein the first end of the second arm and the first end of the first arm are pivotally connected to the rod, and the second end of the first arm and the second end of the second arm are pivotally connected to the connecting piece.

11. The support mechanism of claim 10, wherein the first end of the second arm is adjacent to the first end of the first arm and away from the second end of the first arm; the elastic member is connected to the first end of the first arm and the first end of the second arm.

12. The support mechanism of claim 11, wherein the base comprises a plate and a post substantially perpendicular to the plate, the post comprising two connecting arms, each connecting arm defining a shaft hole, the limiting slot, and a latching slot; the limiting slot and the latching slot are defined at a periphery of the connecting arm.

13. The support mechanism of claim 12, wherein the first arm further comprises two first pivot arms at the first end; the second arm comprises two second pivot arms at the first end.

14. The support mechanism of claim 11, further comprising a connecting mechanism comprising the rod, a first pivot shaft pivotally extending through the first pivot arms of the first arm, and a second pivot shaft pivotally extending through the second pivot arms of the second arm and the other end of the rod; the shaft holes of the connecting arms of the base, and one end of the rod; the second pivot shaft; the first end of the elastic member engages the first pivot shaft.

15. The support mechanism of claim 14, wherein the connecting mechanism further comprises a plurality of washers sleeved on the first pivot shaft and the second pivot shaft.

16. The support mechanism of claim 14, wherein the second arm further comprises a connecting unit comprising a shaft, two rings, a tube, and a fastener, wherein the shaft extends through the second arm, the tube, the rings are sleeved on the tube; and the second end of the elastic member engages with the shaft.

17. The support mechanism of claim 12, wherein a distance between a center of the shaft hole and different points of the guiding surface increases as a distance between the guiding surface and the plate decreases.

* * * * *